J. O. MORSE.
Pipe-Cutter.
No. 212,256.  Patented Feb. 11, 1879.
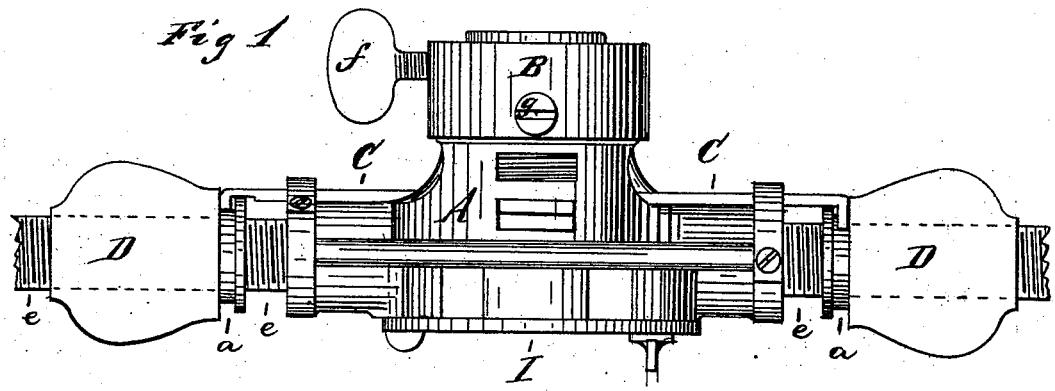
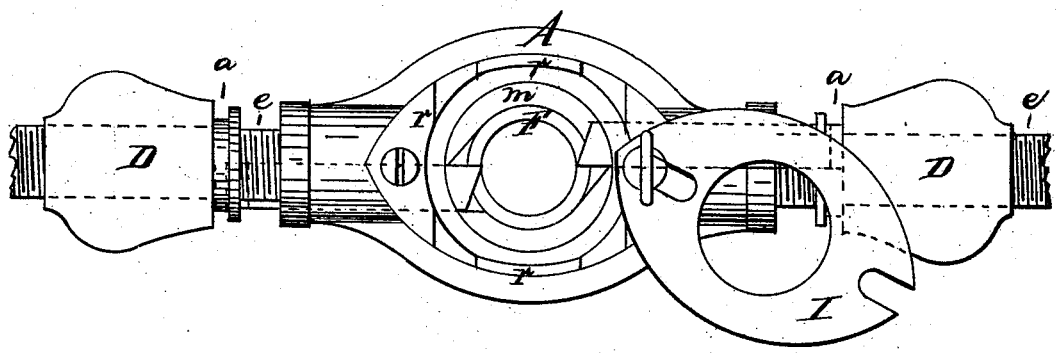
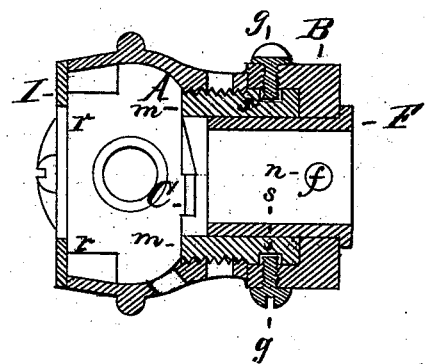
Witnesses
W. L. Bennem
H. H. Isaacs
Inventor
James Otis Morse
by his atty.
E. S. Renwick

UNITED STATES PATENT OFFICE.

JAMES O. MORSE, OF ENGLEWOOD, NEW JERSEY.

IMPROVEMENT IN PIPE-CUTTERS.

Specification forming part of Letters Patent No. 212,256, dated February 11, 1879; application filed July 20, 1878.

*To all whom it may concern:*

Be it known that I, JAMES O. MORSE, of Englewood, in the county of Bergen and State of New Jersey, have made an invention of certain new and useful Improvements in Pipe-Cutters; and that the following is a full, clear, and exact description and specification of the same.

The object of this invention is to furnish a convenient and effective tool or hand implement for cutting wrought-iron pipes for the conveyance of gas and other purposes, so that such pipes can be readily cut by ordinary pipe-fitters at the places where the pipes are put up.

To this end my invention consists of certain combinations of one or more movable slitting-cutters, for slitting or parting a pipe, with other mechanical devices, which are set forth in the claims at the close of this specification.

In order that the invention may be fully understood, I have represented in the accompanying drawings, and will proceed to describe, a pipe-cutter embodying my invention in the best form which I have devised at the present date, it being understood that the form in which my invention may be embodied may be varied, and that parts of it may be used separately from the residue.

Figure 1 of the said drawings represents a side view of the said pipe-cutter. Fig. 2 represents a face view of the same. Fig. 3 represents a central transverse section of the same.

The principal parts of the said pipe-cutter are the revolving stock A, the clamp-guide collar B, the slitting-cutters C, and the handles D. The stock A is hollow, so that it may be slipped over the pipe to be cut, and it may be made with a hollow core, *m*, screwed into it, or the core and stock may be made in one piece, as preferred. The stock is fitted with two handles, D D, which project radially from it, and enable it to be turned as a wrench is.

In practice, I prefer to fit the stock with two movable cutters, C C, arranged at opposite sides of its cavity, so that the pressure of one slitting-cutter against the pipe is counterbalanced in whole or in part by that of the other slitting-cutter at the opposite side; but the tool may be fitted with one slitting-cutter if my entire invention be not used.

Each slitting-cutter is fitted to slide endwise through a slot in the stock A, and the outer end of the slitting-cutter is bent laterally and engaged in a groove, *a*, of the adjacent handle D. Moreover, this handle, instead of being a fixture to the stock, is connected with it by a screw, *e*, so that the turning of the handle axially upon the said screw feeds the slitting-cutter inward against the pipe to be cut.

In order that the slitting cutter or cutters may slit or part the pipe truly, the clamp-guide collar B is provided. This collar is fitted with a clamp-screw, *f*, or other suitable device, by means of which it may be clamped rigidly to the pipe to be cut. The collar also is connected with the stock A through the intervention of screws *g g*, whose inner ends are fitted to move round in a ring groove, *s*, of the core of the stock A, which projects into a circular recess in the collar, and has a circular bearing therein.

When the tool is applied to a pipe to be cut, the clamp-guide collar B is clamped fast to it by turning the clamp-screw inward, so as to hold the tool in place longitudinally of the pipe, and prevents its movement endwise along the pipe, but with the capacity of the stock, handles, and slitting-cutters to turn circumferentially of the pipe, by reason of the circumferential freedom of movement of the ring-groove *s* of the stock upon the points of the connecting-screws *g*, between the clamp-guide collar and the stock. Hence, as the tool is turned, the slitting-cutter will cut a true circumferential groove, and each succeeding circular cut will be in the circumferential line of the preceding one without any effort or care of the workman who uses the tool.

In order that the same tool may be used with greater convenience to cut pipes of different diameters, I provide each tool with one or more removable bushes, F, each pierced with a hole, *n*, for the passage of the clamp-screw, and each having a bore to fit loosely to the exterior of the pipe to which it is appropriate, while its exterior is of the size to fit the bore of the clamp-collar B. By the use of these collar-bushes the same tool may be employed to cut with advantage pipes of smaller diameters than the one for which the bore of its clamp-collar B and core m are suitable. I also prefer to construct the stock with face-projections r r, to hold a square die for cutting the screw-threads upon the end of the pipe, and with a movable cap, I, for holding such a die in place.

The projections r are, by preference, made in one piece with the stock; but they may be made of separate pieces, and secured to the stock by screws. The tool constructed with such projections, or their equivalents, may be used as a screw-plate or die-wrench to screw-thread the pipe after it is cut to length, thus enabling a workman to do two kinds of work with one tool; and when used with a die the cutters are drawn back by turning the handles, and the clamp-screw f is slacked, so as to permit the tool to move longitudinally upon the pipe as the screw-cutting progresses.

The combination of the cutter with a turning handle—that is, a handle turning upon its own longitudinal axis, so that the movement of the handle feeds the cutter forward—is a convenient construction, because it enables the workman to proceed with the work without changing his hand from the handle to a special device for feeding the slitting-cutter.

In some cases I have arranged the slitting-cutter to be fed forward through a hollow handle; but I do not recommend this construction. The employment of screws turning in a circular groove is, in my opinion, the cheapest mode of connecting the clamp-guide collar with the stock with the capacity of the free circumferential movement of the latter relatively to the former without movement longitudinally of the axis thereof; but other means of producing such connection with the said capacity may be employed. The stock is, by preference, perforated laterally, with an opening to permit the chips to fall out as the tool is turned upon the pipe.

When the pipes to be cut are of large size, the workman may find it expedient to turn the implement with greater leverage than is afforded by the turning handles D. In such cases the hands of the operator may be applied to the portions of the screws e beyond the handles D; and these portions may be extended as far as found expedient for the requisite leverage, and their outer ends may be made smooth, so as to form handles for turning the implement; or the screws e may be hollow, and supplementary handles having shanks that will enter the outer ends of the bores of the hollow screws e may be employed to turn the implement.

I claim as my invention in pipe-cutters—

1. The combination, substantially as before set forth, of the clamp-guide collar, the stock having a circular bearing in said collar and connected therewith so as to turn freely circumferentially thereof without moving longitudinally thereof, the movable slitting-cutter, and the handle attached to the stock and constructed to turn upon its own axis to feed the cutter forward.

2. The combination, substantially as before set forth, of the clamp-guide collar, the stock connected with said collar so as to turn freely circumferentially thereof without moving longitudinally thereof, and two movable slitting-cutters arranged at opposite sides of the cavity of said stock.

3. A tool, substantially as before set forth, adapted for cutting and screwing pipes, and composed of the clamp-guide collar, the stock connected with said collar so as to turn freely circumferentially thereof without moving longitudinally thereof, the movable slitting-cutter, and the projections for holding a screw-die.

In witness whereof I have hereto set my hand this 17th day of July, A. D. 1878.

JAMES OTIS MORSE.

Witnesses:
E. S. RENWICK,
W. L. BENNEM.